United States Patent [19]

Fava

[11] 4,129,614
[45] Dec. 12, 1978

[54] THERMOPLASTIC MOLDING COMPOSITION OF POLYMETHYL METHACRYLATE AND RUBBER MODIFIED STYRENE-MALEIMIDE

[75] Inventor: Ronald A. Fava, Monroeville, Pa.

[73] Assignee: ARCO Polymers, Inc., Philadelphia, Pa.

[21] Appl. No.: 863,962

[22] Filed: Dec. 23, 1977

[51] Int. Cl.$^2$ .................. C08L 33/12; C08L 35/06; C08L 53/02

[52] U.S. Cl. ..................... 260/876 B; 260/880 B; 260/880 R

[58] Field of Search ........... 260/876 B, 880 R, 880 B, 260/901

[56] References Cited

U.S. PATENT DOCUMENTS

| | | | |
|---|---|---|---|
| 3,432,479 | 3/1969 | Verdol et al. | 526/52.2 |
| 3,676,404 | 7/1972 | Nield | 260/78 UA |
| 3,883,617 | 5/1975 | Krieg et al. | 260/883 |
| 3,998,907 | 12/1976 | Di Giulio | 260/857 L |

Primary Examiner—Carman J. Seccuro
Attorney, Agent, or Firm—John R. Ewbank; Lewis J. Young

[57] ABSTRACT

Thermoplastic molding composition consists essentially of a blend of:

A. 20-80% by weight of polymethyl methacrylate; and

B. from about 20% to about 80% by weight of a copolymer of three components:

(aa) a rubbery block polymer prepared in a stereospecific system using from 5 to 35% vinyl aromatic compound and from 65 to 95% conjugated alkadiene, said rubbery block copolymer constituting from 5% to 35% of the copolymer of three components.

(bb) an amine nitrogen derivative of an ethylenically unsaturated dicarboxylic acid constituting from 5% to 35% of the copolymer of three components, and (cc) vinyl aromatic composition constituting from 60% to 90% of the copolymer of three components.

3 Claims, No Drawings

THERMOPLASTIC MOLDING COMPOSITION OF POLYMETHYL METHACRYLATE AND RUBBER MODIFIED STYRENE-MALEIMIDE

RELATED INVENTIONS

Reference is made to the applications of Ronald A. Fava, Ser. No. 863,964, filed Dec. 23, 1977 concerning "Moldable Blend of Polymethyl Methacrylate and Styrene-Maleimide" and Ser. No. 863,963, filed Dec. 23, 1977 for "Plastic Alloy of Copolymers", all the disclosure of each of which is deemed here reiterated and incorporated herein.

BACKGROUND OF THE INVENTION

This invention relates to the blending of thermoplastic compositions having characteristics which are desireable but which have heretofor not been readily obtainable at a competitive cost.

Many organic liquids having a moderately low molecular weight are soluble in each other. When the molecular weight of an organic material is sufficiently great (macromolecular) to provide structural strength as a solid, such solid is generally not soluble in other macromolecular structural materials, (i.e. plastics). The compatibility and mutual solubility of organic plastics are generally not observed. Most attempts to mix pellets of different molding compositions at the time when the pellets are fed to an extruder result in extrudates having low strength by reason of the fracture lines at the boundaries amongst the different compositions. The discovery of a compatible blend of plastics, sometime referred to as plastic "alloys" is a significant and unexpected discovery by reason of the incompatibility of most of the conceivable permutations of mixtures of plastics.

Belgian Pat. No. 767,255 describes blends of polymethyl methacrylate and copolymers of styrene and maleic anhydride. DiGiulio U.S. Pat. No. 3,998,907 describes a method of preparing maleimide-containing copolymers by reacting amine or ammonia with particles of the copolymer comprising maleic anhydride under autogenous pressure at 125° to 200° C. Heretofore, copolymers of styrene and methyl methacrylate have been prepared, but such compositions have not had the combination of appropriate viscosity and softening temperatures desired in some operations.

Notwithstanding the persistent effort to prepare appropriate blends, there has been a failure by others to meet the demands for a blend having an attractive combination of adequate fluidity at molding temperatures, adequate stiffness in the molded product, and adequately high softening point.

SUMMARY OF THE INVENTION

In accordance with the present invention, a thermoplastic molding composition is prepared by heat blending polymethyl methacrylate and the terpolymer of three components: (a) a rubbery block polymer prepared in a stereospecific system using from 5 to 35% vinyl aromatic compound and from 65 to 95% conjugated alkadiene, said rubbery block copolymer constituting from 5% to 35% of the copolymer of three components; (bb) an amine nitrogen derivative of an ethylenically unsaturated dicarboxylic acid constituting from 5% to 35% of the copolymer of three components, and (cc) vinyl aromatic composition constituting from 60% to 90% of the copolymer of three components.

The invention is further clarified by reference to a plurality of examples.

EXAMPLES 1 – 4

An extruder was employed for thoroughly mixing pellets of polymethyl methacrylate and pellets of a terpolymer of butadiene, styrene and maleimide. Said terpolymer was prepared by first preparing an organic solution of a block rubbery copolymer derived from the polymerization of 85% butadiene and 15% styrene using butyl lithium as a catalyst. A rubbery block copolymer marketed by Firestone as Steareon 720 is suitable as said block rubbery copolymer, and can be dissolved in xylene to provide a solution. Styrene and maleic anhydride are added to such solution of the block copolymer of 85% butadiene and 15% styrene and subjected to copolymerization in the presence of such solution of rubbery block copolymer so that the termpolymer contains about 13% butadiene, about 7% maleic anhydride and about 80% styrene. The method of Example 1 of DiGiulio 3,998,907, using aqueous ammonia at a temperature of about 147° C. for about 12 hours at a pressure of about 5 atmospheres was employed to imidize the terpolymer, which then contained about 7% maleimide.

A series of compositions was prepared containing varying amounts of the two types of pellets. The extrudate was shaped into testing samples.

The usefulness of polymethyl methacrylate has been somewhat restricted because its softening point, as measured by a Vicat temperature of 241° F, was sufficiently low to be troublesome in some of the intended uses for molded plastic products. Such softening temperature can be increased by the inclusion of relatively small amounts of the maleimide. Particular attention is directed to the fact that a blend of about 40% of a methyl methacrylate and 60% maleimide had the advantageous combination of a flexural modulus of 359,000 psi and a Vicat temperature of 255° F.

The data shown in Table 1 show some of the properties measured for 4 blends of these components. The unblended starting materials can be identified equivalently as Controls A and B, or as Examples A and B.

TABLE I

| Example | % MI-S in Blend | % PMMA in Blend | Izod Impact (ft-lb/in) | Flexural Modulus (10³psi) | Vicat Temp. (° F) |
|---|---|---|---|---|---|
| A | 100 | 0 | 1.40 | 296 | 260 |
| 1 | 80 | 20 | 0.55 | 326 | 258 |
| 2 | 60 | 40 | 0.41 | 359 | 255 |
| 3 | 40 | 60 | 0.37 | 380 | 250 |
| 4 | 20 | 80 | 0.22 | 407 | 246 |
| B | 0 | 100 | 0.25 | 420 | 241 |

EXAMPLE 5

Various types of polymethyl methacrylate molding compositions having different particle sizes, different molecular weights, etc. are employed in experimental blends while obtaining the advantageous results described in connection with Examples 1 – 4. The experimental blends are prepared using maleimidestyrene butadiene terpolymers containing various amounts of maleimide and it is established that terpolymers containing concentrations within the range from 5% to 35% are suitable for use in the blends of the present invention.

EXAMPLE 6

By a series of tests it is established that the imides of maleic acid, fumaric acid, itaconic acid, citraconic acid, mesaconic acid, ethyl maleic acid, methyl itaconic acid, chloromaleic acid, dichloromaleic acid, bromomaleic acid, and dibromomaleic acid, are suitable as the amino nitrogen derivative of the ethylenically unsaturated dicarboxylic acid in the blends of the present invention. In preparing the nitrogen derivatives, methyl amine, ammonia, ethyl amine, propyl amine, and/or isopropyl amine may be utilized. It is appropriate to prepare the nitrogen derivative of the acid prior to the copolymerization, or if desired, the terpolymer can be prepared from a precursor such as the anhydride, and the terpolymer can be subjected to the ammonia type compound at an elevated pressure and temperature to prepare the nitrogen derivative of the copolymer comprising the ethylenically unsaturated dicarboxylic acid moiety. The terpolymer containing maleic anhydride is converted in the presence of a basic nitrogen system at a temperature of from about 125° to 200° C. at an autogenous pressure for 0.5 to 48 hours and thereafter depressurizing and devolatilizing the product.

EXAMPLE 7

Blends of 50% polymethyl methacrylate and 50% copolymer of rubber-modified styrene-maleimide containing about 8% maleimide are prepared by preparing solutions of the two plastics in halogenated organic solvent, mixing such solutions, volatilizing the solvents, and extruding the thus precipitated mixture. The characteristics of the samples are intermediate those of Example 2 and 3. A basis is thus established for the conclusion that the advantageous results shown in Table I are attributable to the advantageous alloying propensities of the components and not primarily to the method of blending.

EXAMPLE 8

Blends of polymethyl methacrylate and rubber-modified styrene-maleimide are prepared throughout the 20 to 80% and 80 to 20% ranges, using a series of rubber-modified styrene-maleimide copolymers. It is thus established the attainment of advantageous results is not jeopardized by conventional variations in the method of preparing the maleimide, the use of ammonia, the use of choice of lower alkyl primary amine, or mixtures thereof, and similar modifications. The minimum amount of maleimide in the copolymer must be at least 5%, and lesser amounts fail to impart to the blends the desirable properties which characterize the blends of the present invention. The maximum amount of maleimide in the terpolymer must not be greater than 35% because the extrudability of the hot mix is impaired by excessive concentrations of the maleimide. Some association of the imide group of the copolymer chain and the ester group of the methyl methacrylate chain is indicated as a synergistic advantage of the unique alloys of the present invention. The rubbery block copolymer must be present in a concentration within the range from 5 to 35%. The amount of styrene in the terpolymer must be from 60% to 90%.

The block copolymers desirably are those having a major portion of blocks of conjugated diene having an average molecular weight greater than the average molecular weight of the blocks of vinyl aromatic compounds. The vinyl aromatic component generally constitutes from about 5% to about 35% of the block copolymer. The diene content desirably is from about 65 to 95%. The conjugated diene may be butadiene, isoprene, chloroprene and piperylene. Block polymers can be prepared using a solvent such as hexane for both the vinyl aromatic monomer and the diene, using 2-lithium butyl as the catalyst. Among the suitable block copolymers is Stereon 720, marketed by Firestone, and containing about 90% butadiene and about 10% styrene.

The block copolymer rubber can be dissolved in a monomeric vinyl aromatic composition such as styrene, initiating polymerization, and adding the ethylenically unsaturated dicarboxylic acid derivative incrementally during polymerization. U.S. Pat. No. 3,998,907 describes a method of preparing a terpolymer of rubber-modified styrene-maleic anhydride terpolymer.

Various modifications of the invention are possible without departing from the scope of the invention as set forth in the claims.

The invention claimed is:

1. A thermoplastic molding composition which comprises:
   A. from about 20% to about 80% by weight of polymethyl methacrylate;
   B. from about 20% to about 80% by weight of a copolymer of three components:
      (aa) a rubbery block polymer prepared in a stereospecific system using from 5 to 35% vinyl aromatic compound and from 65 to 95% conjugated alkadiene, said rubbery block copolymer constituting from 5% to 35% of the copolymer of three components.
      (bb) an imide derivative of an ethylenically unsaturated dicarboxylic acid constituting from 5% to 35% of the copolymer of three components, and
      (cc) vinyl aromatic composition constituting from 60% to 90% of the copolymer of three components.

2. The composition of claim 1 in which the concentration of each of A and B is about 50%.

3. The composition of claim 1 in which said copolymer of three components is prepared by subjecting a copolymer of a rubbery block polymer prepared in a stereospecific system using from 5% to 35% vinyl aromatic compound and from 65% to 95% conjugated alkadiene, said rubbery block copolymer constituting from 5% to 35% of the copolymer of three components, from 5% to 35% maleic anhydride, and from 60% to 90% styrene to a basic aqueous nitrogenous system at a temperature of from about 125° to about 200° C. at an autogenous pressure of 0.5 to 48 hours and thereafter depressurizing and devolatilizing the product.

* * * * *